United States Patent Office
3,639,420
Patented Feb. 1, 1972

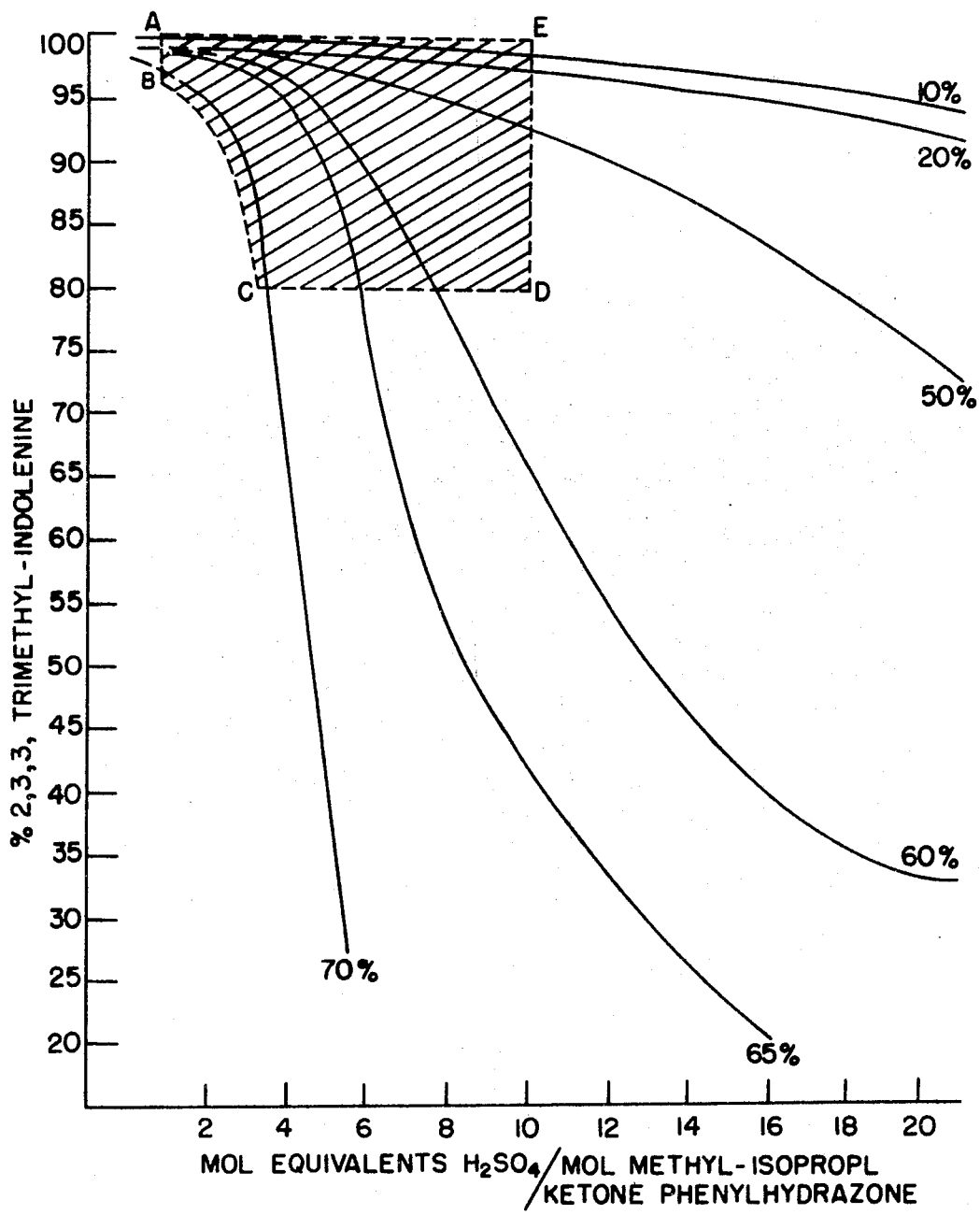

3,639,420
PROCESS FOR THE PREPARATION OF
2,3,3-TRIMETHYL INDOLENINES
Hugo Illy and Lance Harmon Funderburk, Toms River,
N.J., assignors to Toms River Chemical Corporation,
Toms River, N.J.
Filed Feb. 21, 1968, Ser. No. 707,073
Int. Cl. C07d 27/56
U.S. Cl. 260—319.1                                    4 Claims

ABSTRACT OF THE DISCLOSURE

A process is provided for the preparation of 2,3,3-trimethyl indolenines of the formula

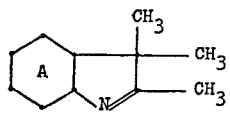

wherein ring A can contain substituents such as halogen, illustratively chlorine or bromine, lower alkyl, such as methyl, ethyl, propyl or butyl, lower alkoxy, such as methoxy, ethoxy, propoxy or butoxy, comprising reacting a methyl-isopropyl-ketone-phenylhydrazone containing at least one hydrogen in ortho position to the hydrazino group with an acid having a pK value of less than 1.3 in a mol ratio of 1 to 10 mole equivalents of acid per mole of the methyl-isopropyl-ketone-phenylhydrazone at a temperature of 65° to 100° C.

Suitable acids are the strong mineral acids such as sulfuric acid, hydrochloric acid and sulfonic acids such as naphthalenesulfonic acid.

The 2,3,3-trimethyl indolenines obtained by the practice of the present invention are valuable intermediates for the manufacture of cyanine dyestuffs.

BACKGROUND OF THE INVENTION

The application of the Fischer indole synthesis to the preparation of indolenines, useful intermediates in the preparation of cyanine dyes, is known.

Its use in the preparation of 2,3,3-trimethyl indolenine by the cyclization of methyl-isopropyl-ketone-phenylhydrazone in absolute alcohol in the presence of zinc chloride is described by Plancher in Berichte 31, page 1496. This procedure, however, has disadvantages in commercial practice since it is difficult to separate the zinc salt and the yield of product is poor.

German Patent 238,138 describes an improvement over the process of Plancher in which the reaction is conducted in the presence of a high boiling point solvent. The final product is obtained in a form which is more readily filterable and the yield is increased. However, extended periods of refluxing are required and the yields obtained do not exceed 75%. This operation requires a long time and retards the finishing of each batch, more manipulation and additional equipment being needed, which is, of course, a considerable disadvantage in a technical procedure.

It is desirable to provide an economical, commercially practicable process for the preparation of 2,3,3-trimethyl indolenines in good yield and high purity and in a form which is readily separable.

SUMMARY OF THE INVENTION

The present invention relates to and has for its object the provision of a novel process for the preparation of 2,3,3-trimethyl indolenines by effecting the cyclization of methylisopropyl-ketene-phenylhydrazones having at least one hydrogen in ortho position to the hydrazino group in the presence of an acid having a pK value under 1.3 in a mol ratio of 1 to 10 mol equivalents of acid per mol equivalent of hydrazone at a temperature of from about 65° to about 100° C., the relationship of mole ratio to acid concentration being set forth in the accompanying drawing. The pK of an acid HA is defined by the equation $$pK = (-\log K); \text{ where } K = \frac{(H^+)(A^-)}{(HA)}$$

BRIEF DESCRIPTION OF THE DRAWING

The figure of the drawing represents a diagram showing the yield of 2,3,3-trimethyl indolenine as a function of the mole equivalents of sulfuric acid employed at different concentrations.

In the accompanying diagram there is presented a graph of percentage yield of 2,3,3-trimethyl indolenine plotted against the mole equivalents of sulfuric acid employed per mole equivalent of methyl-isopropyl-ketone-phenylhydrazone. All curves on the graph are for varying concentrations of sulfuric acid employed. The broken lines AB, BC, CD, DE and EA define the area representing the preferred combination of acid concentration and mole ratio of acid/hydrazone.

DESCRIPTION OF THE PREFERRED EMBODIMENT

In the process of the present invention a methylisopropyl-ketone-phenylhydrazone of the formula

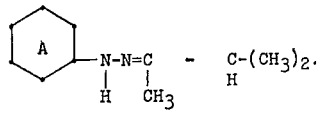

is heated with an acid having a pK value under 1.3 in a mol ratio of acid to hydrazone and at an acid concentration defined by the area ABCDE on the accompanying diagram.

The methyl-isopropyl-ketone-phenylhydrazones employed according to the present invention have at least one hydrogen in ortho position to the hydrazino group. The A ring in the formula given above can be further substituted by non-ionic substituents. Illustrative of such substituents are the halogens, such as chlorine or bromine, alkyl groups, particularly lower alkyl groups such as methyl, ethyl, propyl, isopropyl and butyl and alkoxy groups, particularly lower alkoxy such as methoxy, ethoxy, propoxy, isopropoxy and butyl. Thus, there can be employed according to the present invention methyl-isopropyl-ketone-phenylhydrazone,
methyl-isopropyl-ketone-4-chlorophenylhydrazone,
methyl-isopropyl-ketone-2-chlorophenylhydrazone,
methyl-isopropyl-ketone-3-chlorophenylhydrazone,
methyl-isopropyl-ketone-4-methoxyphenylhydrazone,
methyl-isopropyl-ketone-3-methylphenylhydrazone,
methyl-isopropyl-ketone-4-bromophenylhydrazone,
methyl-isopropyl-ketone-2-bromophenylhydrazone,
methyl-isopropyl-ketone-3-bromophenylhydrazone,
methyl-isopropyl-ketone-3-ethylphenylhydrazone,
methyl-isopropyl-ketone-3-propylphenylhydrazone,
methyl-isopropyl-ketone-3-butylphenylhydrazone,
methyl-isopropyl-ketone-4-ethoxyphenylhydrazone,
methyl-isopropyl-ketone-4-propoxyphenylhydrazone,
methyl-isopropyl-ketone-4-butoxyphenylhydrazone,
methyl-isopropyl-ketone-4-nitrophenylhydrazone.

The acids employed according to the present invention are those acids having a pK value of less than 1.3 whereby the pK value of an acid HA there is meant pK'=—log.K) where $$K = \frac{(H^+)(A^-)}{(HA)}$$

Thus, there can be employed the substituted or unsubstituted aliphatic or aromatic carboxylic acids. However, in view of the cost of these acids and the necessity for using large quantities of such acids and longer reaction times in order to obtain satisfactory yields, it is preferred to use strong mineral or sulfonic acids. Representative of the acids employed in the practice of the present invention are hydrobromic, perchloric, polyphosphoric acid, benzenesulfonic acid, naphthalenesulfonic acid and the like. In particular, it is preferred to use sulfuric acid or hydrochloric acid in carrying out the process of the present invention.

The concentration of the acid employed can vary from about 10% to about 100% or from 10% to 75% with the range of 15 to 75% representing the preferred concentration. Where higher concentrations are employed, it is advantageous to employ an inert organic solvent such as xylene or chlorobenzene.

The acid is employed in a mol ratio of 1 to 10 mole equivalents per mole of the methyl-isopropyl-ketone-phenylhydrazone. The particular molar proportions employed will depend on the concentration of the acid employed as illustrated in the accompanying diagram.

In carrying out the process temperatures of from about 60° to about 100° C. are employed. The preferred temperatures are from 85° to 95° C.

The reaction is effected in a comparatively short time and usually a period of about 2 hours is sufficient. However, it is obvious that the time can be shortened or lengthened by varying other operating conditions, such as the temperature.

It is a particular advantage of the present process that the production of the desired 2,3,3-trimethyl indolenines can carry through in a single batch process from the initial reactants rather than from the methyl-isopropyl-ketone-phenylhydrazone by charging the corresponding phenylhydrazine, methylisopropyl ketone and the acid to the reaction vessel.

EXAMPLE 1

176.3 g. (1 mol) of methyl-isopropyl-ketone-phenylhydrazone are dropped over 30 minutes into 490 g. of 20% sulfuric acid (2 mole equivalents) with stirring. The reaction flask is then heated to 95° C. in one hour and maintained at this temperature for an additional 2 hours. The melt is neutralized with a solution of 95 parts of 50% sodium hydroxide. After stirring 15 minutes the oil layer is separated. On distillation at 12 mμ under vacuum, 140 g. (94%) of 2,3,3-trimethyl indolenine are obtained.

EXAMPLE 2

102 g. sulfuric 96% are added dropwise to 390 g. of ice. 108 g. phenylhydrazine are then added in the course of 30 min. with stirring. The temperature rises from —10 to 20° C. 92.5 g. methyl-isopropylketone are dropped in over 45 minutes and the reaction mixture is heated in one hour to 90° and maintained at this temperature for an additional 2 hours. The melt is neutralized with a solution of 95 parts of 50% sodium hydroxide. After stirring 15 minutes the oil layer is separated. On distillation at 12 mμ under vacuum 135 g. (85% theory) of 2,3,3-trimethyl indolenine is obtained.

EXAMPLE 3

The procedure of Example 1 is repeated except that the melt is held at 75° for a period of 3 hours. The yield of 2,3,3-trimethyl indolenine obtained is 95% of theory.

EXAMPLE 4

44 g. of methylisopropyl-ketone-phenylhydrazone (¼ mol) are dropped with stirring into 17.5 g. sulfuric acid 70% (1 mol. equivalent). The exothermic reaction medium thickens at the beginning and becomes thin after the temperature reaches 80° C. The melt is held at 95° C. for 3 hours. 150 g. of ice water are added and the melt is neutralized with a solution of 95 g. of 50% sodium hydroxide. After stirring for 15 minutes the oil layer is separated. On distillation at 12 mμ under vacuum 2,3,3-trimethylindolenine is obtained in a yield of 90%.

EXAMPLE 5

47.5 g. methylisopropylketone p-tolylhydrazone are added at 20°, with stirring to 244 g. 20% sulfuric acid (4 mole equivalent). The mixture is heated to 95° C. and maintained at this temperature for 3 hours. After cooling to 25° C. and neutralizing with sodium hydroxide, the oily product is extracted with xylene and the xylene is evaporated. Analysis of the residue shows that 41.3 g. of 2,3,3,5-tetramethylindolenine (95% yield) are obtained.

EXAMPLE 6

The procedure of Example 5 is repeated except that 37.5 g. of methylisopropyl ketone parachlorophenylhydrazone and 183 g. of 20% sulfuric acid are employed. 34.4 g. of 5-chloro-2,3,3-trimethyl indolenine are obtained.

When the 183 g. of 20% sulfuric acid used above are replaced by 46.5 g. of 79% sulfuric acid the yield of indolenine obtained is 92% of theory.

EXAMPLE 7

44 g. methylisopropylketone phenylhydrazone is added to 45.6 g. 37% hydrochloric acid (1.85 mole equivalents) and the mixture is heated to 80° for 3 hours. After cooling and neutralizing with sodium hydroxide, the separated oily product (31.6 g.) is 95% 2,3,3-trimethyl indolenine.

We claim:
1. A process for the preparation of 2,3,3-trimethyl indolenines of the formula

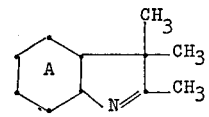

wherein ring A is unsubstituted or substituted by halogen, lower alkyl or lower alkoxy; which comprises reacting the corresponding N-unsubstituted methyl-isopropylketone-phenylhydrazone having at least one hydrogen in ortho position to the hydrazino group with an acid having a pK value of less than 1.3 and a concentration of 10–75% in a mol ratio of 1 to 10 mol equivalents at a temperature of 65° C. to 100° C., the mole ratio and concentration having the relationship lying within the area ABCDE in the accompanying diagram.

2. A process according to claim 1 where the acid is hydrochloric acid of a concentration of 10–39%.

3. A process for obtaining 2,3,3-trimethyl indolenine according to claim 1 by reacting methyl-isopropyl-ketone-phenylhydrazone with sulfuric acid.

4. A process for obtaining 2,3,3-trimethyl-5-chloroindolenine according to claim 1 by reacting methyl-isopropyl-ketone-4-chlorophenylhydrazone with sulfuric acid.

References Cited

UNITED STATES PATENTS 2,248,155   8/1941   Zellner _____ 260—326.13

OTHER REFERENCES

Elderfield: Heterocyclic Compounds, vol. 3, pp. 89–90 (1952).

ALEX MAZEL, Primary Examiner

J. A. NARCAVAGE, Assistant Examiner

U.S. Cl. X.R.

260—326.16